United States Patent Office 3,547,649
Patented Dec. 15, 1970

3,547,649
MORDANTS FOR ACID DYES COMPRISING POLYMERS CONTAINING QUATERNARY PHOSPHONIUM GROUPS
Simone Franço, Casalgrasso, Cuneo, Italy, assignor to Ferrania, S.p.A., Milan, Italy
No Drawing. Filed Mar. 29, 1966, Ser. No. 538,214
Claims priority, application Italy, Apr. 23, 1965, 16,334
The portion of the term of the patent subsequent to Feb. 25, 1986, has been disclaimed
Int. Cl. G03c 1/04
U.S. Cl. 96—114                                7 Claims

ABSTRACT OF THE DISCLOSURE

A recording element is shown having a colloidal binder containing a mordant for acid dyes, the mordant being a polymer containing quaternary phosphonium groups.

---

This invention relates to photographic elements containing polymeric compounds having recurring quaternary phosphonium radicals as mordants for acid dyes. In one aspect this invention relates to the incorporation of polymeric quaternary phosphonium compounds in hydrophilic colloidal layers, such as gelatin.

In certain photographic processes it is necessary to incorporate in at least one of the several layers any variety of water soluble acid dyes. Such acid dyes may, for example, be contained in filter layers or antihalation layers. Water soluble acid type dyes are also used in dye transfer processes in which the dye is transferred from a dye soaked, hardened gelatin relief matrix to another film containing a mordant, which serves to fix the transferred acid dyes. Among the suitable mordants which are normally utilized are linear polymers containings quaternary ammonium groups (see U.S. Pat. No. 2,548,564), guanyl hydrazones derived from polymers containing carbonyl groups (see U.S. Pat. No. 2,945,006), reaction products of polyvinyl sulfonates and pyridine or substituted amino pyridines (see U.S. Pat. No. 2,768,078), or polymers containing hydrazinium salts (see Italian Pat. No. 657,846).

One of the objects of the present invention is to provide a new and useful class of mordant for photographic films. Still another object of the invention is to provide a class of polymeric mordants having outstanding ability to fix water soluble acid dyes. Other objects and advantages of the present invention will be apparent from the following disclosure and examples.

In accordance with this invention it has been found that polymers containing recurring quaternary phosphonium groups are characterized by their outstanding ability to fix acid dyestuffs. Such polymeric quaternary phosphonium compounds have been found to be exceptionally useful in photographic applications, particularly in antihalation layers, filter layers and intermediate or barrier layers designed to prevent the diffusion of the acid dyestuffs from one layer into another, and in photographic processes utilizing the transfer of a dyestuff from a hardened, dye containing gelatin relief matrix to a separate layer or sheet containing a gelatin or other hydrophilic colloid and a mordant. In such applications the use of polymeric quaternary phosphonium compounds to fix acid dyes and prevent their migration, both laterally within a given layer and transversely from one layer to another, produces color images having high definition.

The molecular weight of the polymeric quaternary phosphonium compounds may range very widely, depending on the specific balance of properties desired and the specific application. The quaternary phosphonium group is an effective site for mordanting irrespective of its position in the polymer chain, and it has been found that the phosphorous atom of the quaternary phosphonium group may be appended to the polymer chain, either directly or through a bridging radical, or may be incorporated as one atom of the polymer chain itself. Thus, for example, the quaternary phosphonium grouping may be of the type:

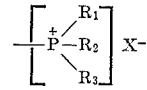

or may be of the type:

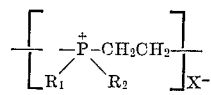

wherein $R_1$, $R_2$ and $R_3$ are alkyl, aryl, aralkyl or two of which form the atoms required to complete a 5 or 6 membered phosphorus containing heterocyclic ring; and $X^-$ is a readily dissociable anion of a mineral acid, such as a halogen acid (e.g., hydrochloric acid), an alkanesulfonic acid (e.g., methanesulfonic acid), an aryl sulfonic acid (e.g., benzenesulfonic acid) or a carboxylic acid having from 2 to 20 carbon atoms. Conversion of one anion into another anion can be effected, if desired by ion exchange techniques.

The preparation of suitable polymeric quaternary phosphonium compounds can be accomplished by various techniques. The reaction of a secondary phosphine and a vinyl derivative in the presence of a free radical yielding initiator is described in British Pat. No. 898,759. U.S. Pat. No. 3,068,214 discloses the reaction of trisubstituted phosphines and copolymers of haloalkylated styrene and acrylamide monomers U.S. Pat. No. 3,065,272 teaches the polymerization of vinyl aromatic monomers containing quaternary phosphonium groups in the presence of free radical yielding initiators. In J. Poly. Sci., 59, 379–387 (1962) triphenylphosphine is reacted in the presence of aluminum trichloride with chloromethylation products of styrene copolymers. The reaction of vinyl esters of halosubstituted acids with trialkylphosphine and subsequent polymerization is described in U.S. 3,125,555. Polymers containing a plurality of 1,2-epoxy groups may be quaternized by the reaction therewith of trisubstituted phosphine, such as trimethylphosphine, as described in U.S. application File No. 24,048, now Pat. No. 3,041,987 by the same applicants as in the present invention.

The polymeric quaternary phosphonium compounds of this invention may also contain other reactive groups, such as epoxy groups, and the presence of other reactive groups may be desirable to modify the polymer properties for a particular mordant use.

The following examples are presented to better illustrate the present invention without in any way limiting the scope thereof.

EXAMPLE 1

Anhydrous $ZnCl_2$ (8 grams) was added to 41.2 grams of low molecular weight polystyrene dissolved in 100 ml. of monochloromethyl methyl ether and 120 ml. of methylene chloride in a flask equipped with stirrer, condenser and calcium chloride tube. The reaction was slightly exothermic, but the temperature dropped to the original ambient value after 2 hours. After 12 hours of reaction 160 ml. of a 1/3 ratio water/dioxane mixture was added. Two separate layers formed, and the upper layer was separated. Methanol was added to precipitate the white product which, after washing with water until no further chloride ion was detected in the wash water, was then air dried. This product had a chlorine content of 12.3%.

Ten grams of chloromethylpolystyrene prepared in the above manner was dissolved in 50 ml. of benzyl alcohol, and 10 ml. of triethylphosphine having a boiling point of 127–130° C. (prepared from ethylmagnesium bromide and phosphorus trichloride according to the teachings of Ber. 39, 161), was added and the mixture was maintained at 65° C. for 15 hours. The resulting solution was treated with diethyl ether-acetone mixture to precipitate a solid. After vacuum drying a white powder was obtained with a chlorine ion content of 7.3%. The yield was 11 grams. 100 grams of this product contained about 56 grams of the following recurring units:

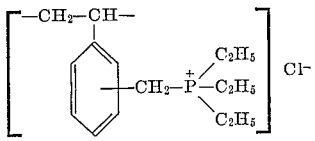

This product was soluble in alcohol, water, water-acetone mixture anr water-dioxane mixture. If the reaction is carried out in an aqueous solvent, secondary reactions can occur more easily, and the quaternization reaction is accordingly less complete.

EXAMPLE 2

Ten grams of chloromethyl polystyrene prepared as reported in Example 1, were dissolved in 50 ml. of distilled benzyl alcohol, and 2.4 ml. of freshly distilled triethylamine (75% of the theory for a complete quaternization) was added. The mixture was heated to 65° C. After 15 hours the solution obtained was cooled, and the polymer was recovered by precipitation in diethyl ether and vacuum-drying. Yield: 11 grams; Cl⁻ content=4.8%.

100 grams of this product contained about 34.5 grams of the recurring units:

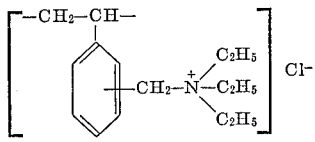

10 grams of the quaternary ammonium partial salt thus prepared was dissolved in 50 ml. of distilled benzyl alcohol. 10 ml. of distilled triethylphosphine was added, and the mixture was maintained at 65° C. for 16 hours. Finally the solution was poured into diethyl ether, where the polymer precipitated as a white solid. This was then filtered and vacuum-dried. Yield=10.5 grams; chloride content=6.5%.

EXAMPLE 3

Ten grams of chloromethyl polystyrene, prepared as reported in Example 1, was dissolved in 50 ml. of distilled toluene, and 15 grams of triphenylphosphine was added. The mixture was heated to 80° C. After a few hours the product which separated during the reaction was redissolved by the addition of 25 ml. of ethanol. The heating at 80° C. was continued for a total of 25 hours. Finally, the reaction mixture was cooled, suitably diluted with ethanol and the polymer was precipitated in 1000 ml. of diethyl ether. The polymer thus recovered was washed several times with ether and finally dried under vacuum at room temperature. Yield: 17 grams; Cl⁻ content=5.1%.

100 grams of product contained about 59 grams of units:

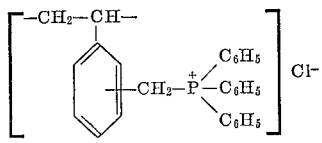

EXAMPLE 4

To 375 grams of a normal positive-type photographic emulsion was added 105 ml. of a 5% aqueous solution of the polymeric mordant described in Example 1. The pH of this mixture was adjusted to a value of 4.3–4.4, and 10 ml. of 4% formaldehyde solution was added. The mixture was then spread on a support of cellulose acetate to obtain a dry film having a thickness of 10 microns. After a few days of aging at room temperature the photographic material thus prepared was processed to obtain a colored image by transfer of a dye from a relief matrix. The matrix was obtained by a pyrogallol tanning development of an imagewise exposed photographic film and subsequent removal of the untanned or unhardened gelatin portions with hot water. The matrix was then soaked with an aqueous acetic acid solution of a magneta colored acid dye, and was contacted with the above material, which had been soaked in water at 40° C. After allowing about 1 minute for dye transfer, an image having high definition and good contrast without contamination of the matrix was obtained.

EXAMPLE 5

To 20 grams of a photographic grade gelatin dissolved in 350 ml. of water containing 0.1 gram of saponin and 0.8 gram of glycerin was added 118 ml. of a 5% aqueous solution of the polymeric mordant prepared according to Example 2. The pH was then adjusted to a value of about 4.5, and 6.0 ml. of a 4% formaldehyde solution was added. A receptor sheet was prepared by coating this solution as a thin layer onto a cellulose acetate base. The printing of a colored image by means of three relief matrices prepared as described in Example 4, respectively saturated with yellow, magenta and cyan dyes, produced a color image having excellent definition on the receptor sheet.

EXAMPLE 6

To an aqueous solution containing 2.5 grams of gelatin and 0.8 gram of Acid Yellow dye (C.I. 19140) in 35 ml. of water was slowly added with good stirring 80 ml. of a 5% water-alcohol solution of the product of Example 2 and 0.30 gram of chrome alum. The solution obtained was then utilized to provide a yellow filter layer in a conventional three-color photographic construction, the density of which in blue light was 1.5. The mordant prevented the yellow dye from diffusing into the adjacent layers prior to processing.

EXAMPLE 7

Five grams of gelatin was dissolved in 450 ml. of water. After addition of 0.12 gram of saponin and 0.75 gram of glycerin 26.5 ml. of a 5% water solution of the mordant prepared as reported in Example 1 was added. The pH was adjusted to a valve of 4.2–4.3, and 7.5 ml. of a 4% aqueous formaldehyde solution was added. The solution thus obtained was then coated as a thin layer on a layer of a positive-type, silver halide-gelatin photosensitive emulsion. The resulting product had good photographic sensitometric characteristics. This was useful as acid dye-acceptor film.

Various other embodiments of the present invention will be apparent to those skilled in the art without departing from the scope thereof.

The embodiments of the invention in which an exclusive property or privilege is claimed are defined as follows:

1. A recording element containing at least one layer of a hydrophilic colloidal binder containing therein a mordant for acid dyes, said mordant being a polymer having recurring quaternary phosphonium groups covalently bonded thereto.

2. The recording element of claim 1 in which said layer contains a water soluble acid dyestuff fixed by said polymer containing recurring quaternary phosphonium groups.

3. A recording element containing at least one layer of a hydrophilic colloidal binder containing therein a mordant for acid dyes, said mordant being a polymer which has appended thereto recurring quaternary phosphonium groups of the structure

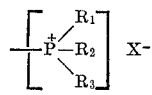

wherein $R_1$, $R_2$ and $R_3$ are alkyl, aryl, aralkyl or two of which form the atoms required to complete a 5 or 6 membered heterocyclic ring and wherein X is an anion.

4. A recording element containing at least one layer of a hydrophilic colloidal binder containing therein a mordant for acid dyes, said mordant being a polymer which has incorporated in its chain recurring quaternary phosphonium groups of the formula

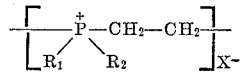

wherein $R_1$ and $R_2$ are alkyl, aryl, aralkyl or two of which form the atoms required to complete a 5 or 6 membered heterocyclic ring and wherein X is an anion.

5. A recording element containing at least one layer of a hydrophilic binder containing therein a mordant for acid dyes, said mordant being a polymer which contains recurring units of the formula

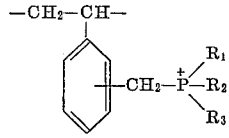

wherein $R_1$, $R_2$ and $R_3$ are alkyl, aryl, aralkyl or two of which form a 5 or 6 membered heterocyclic ring.

6. The recording element of claim 5 wherein said polymer contains recurring units of the formula

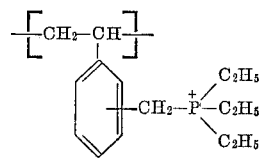

7. The recording element of claim 5 wherein said polymer contains recurring units of the formula

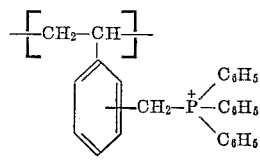

References Cited

UNITED STATES PATENTS

| | | | |
|---|---|---|---|
| 3,429,839 | 2/1969 | Franco | 96—57 |
| 3,068,214 | 12/1962 | Rassweiler et al. | 260—87.5 |
| 2,548,564 | 4/1951 | Sprague et al. | 96—84 |
| 3,271,147 | 9/1966 | Bush | 96—57 |

NORMAN G. TORCHIN, Primary Examiner

JUDSON R. HIGHTOWER, Assistant Examiner

U.S. Cl. X.R.

96—57